(12) United States Patent
Johnson

(10) Patent No.: US 7,740,979 B2
(45) Date of Patent: Jun. 22, 2010

(54) ALKALINE ELECTROCHEMICAL CELL CAPABLE OF PROVIDING OPTIMUM DISCHARGE EFFICIENCIES AT A HIGH TECH DRAIN RATE AND A LOW DRAIN RATE

(75) Inventor: Robert P. Johnson, Lakewood, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1664 days.

(21) Appl. No.: 10/954,389

(22) Filed: Sep. 30, 2004

(65) Prior Publication Data

US 2006/0068288 A1    Mar. 30, 2006

(51) Int. Cl.
*H01M 6/00* (2006.01)
*H01M 4/50* (2006.01)
*H01M 4/58* (2006.01)
*H01M 2/18* (2006.01)

(52) U.S. Cl. .............. 429/122; 429/224; 429/229; 429/164; 429/140; 429/60

(58) Field of Classification Search .............. 429/122, 429/206, 209, 224
See application file for complete search history.

(56) References Cited

U.S. PATENT DOCUMENTS

| | | | | |
|---|---|---|---|---|
| 3,348,973 A | * | 10/1967 | Dirkse | 429/206 |
| 4,055,709 A | * | 10/1977 | Medford | 429/49 |
| 6,074,781 A | * | 6/2000 | Jurca | 429/209 |
| 6,383,674 B1 | | 5/2002 | Urry | |
| 7,045,247 B1 | * | 5/2006 | Copeland et al. | 429/164 |
| 7,232,628 B2 | * | 6/2007 | Randell | 429/224 |
| 2001/0053473 A1 | * | 12/2001 | Getz | 429/128 |
| 2003/0079337 A1 | * | 5/2003 | Woodnorth et al. | 29/623.1 |
| 2003/0170537 A1 | | 9/2003 | Randell et al. | |
| 2004/0058234 A1 | | 3/2004 | Slezak | |
| 2004/0058235 A1 | * | 3/2004 | Huang et al. | 429/164 |
| 2005/0106461 A1 | | 5/2005 | Moore et al. | |
| 2005/0130041 A1 | | 6/2005 | Fensore | |
| 2005/0181278 A1 | | 8/2005 | Cui et al. | |

FOREIGN PATENT DOCUMENTS

WO    WO 02/101858 A    12/2002
WO    WO03/071653    *  8/2003

* cited by examiner

*Primary Examiner*—Dah-Wei D Yuan
*Assistant Examiner*—Maria J Laios
(74) *Attorney, Agent, or Firm*—Russell H. Toye, Jr.

(57) ABSTRACT

An alkaline electrochemical cell capable of providing optimum discharge efficiencies at both a high tech drain rate and a low drain rate is disclosed. In one embodiment, the ratio of the anode's electrochemical capacity to the cathode's electrochemical capacity is between 1.33:1 and 1.40:1 and the surface area of the anode to cathode interface is maximized.

29 Claims, 4 Drawing Sheets

| DISCHARGE TESTS | CELLS OF THIS INVENTION (RANGE) | COMPETITORS (BEST INDIVIDUAL CELL) | | | |
|---|---|---|---|---|---|
| | | A | B | C | D |
| 100 MILLIAMPS, ONE HOUR PER DAY | 94.4-95.7 | 90.8 | 88.7 | 92.7 | 90.3 |
| 3.3 OHM, FOUR MINUTES PER HOUR, EIGHT HOURS PER DAY | 83.3-84.6 | 77.3 | 72.6 | 76.0 | 76.7 |
| 250 MILLIAMPS, ONE HOUR PER DAY | 78.5-84.3 | 80.3 | 76.6 | 76.1 | 79.4 |

ALKALINE ELECTROCHEMICAL CELL CAPABLE OF PROVIDING OPTIMUM DISCHARGE EFFICIENCIES AT A HIGH TECH DRAIN RATE AND A LOW DRAIN RATE

BACKGROUND OF THE INVENTION

This invention generally relates to an alkaline cell comprising manganese dioxide. More particularly, this invention is concerned with an alkaline electrochemical cell that is capable of providing optimum service at various discharge conditions.

Commercially available cylindrical alkaline electrochemical cells are widely available in cell sizes commonly known as LR6 (AA), LR03 (AAA), LR14 (C) and LR 20 (D). In many cases the cells are purchased by consumers and then stored until they are needed to power a device. Due to the proliferation of battery powered devices, many consumers own numerous battery powered devices. Some of the devices that may be found in one home include: a radio; a remote control for a television set; a tape recorder; toys for children; an handheld electronic game; a compact disc player; a camera that incorporates a flashlight unit and 35 millimeter film; and a digital camera. Collectively, these devices represent a wide range of electrical discharge conditions. For example, a tape player is known within the battery manufacturing field as a "low drain" device because it needs the battery to supply current at a low rate and with substantial rest periods between activations. A typical discharge regime for a battery in a tape player can be simulated by discharging a single LR6 size battery at 100 milliamps for one hour per day. Another device, such as a flashlight powered by LR6 size batteries, imposes a low to moderate drain on the battery. Discharging an LR6 battery across a 3.3 ohm resistor for four minutes per hour, eight hours per day, is an accepted test for simulating LR6 performance in a flashlight. Yet another device, such as a compact disc player, requires several batteries to supply current at a faster rate than is required by a tape player but with substantial rest periods between activations (i.e. 250 milliamps for one hour per day) and is known as a "high tech" device. Other devices, such as cameras with 35 mm film and a flash unit contained therein, require the battery to supply current at a substantial current (i.e. 1000 milliamps, 10 seconds on, 50 seconds off, for one hour per day) and is recognized as a "high drain" device. When consumers purchase batteries, the consumer may not know the device into which a particular battery will be inserted. Consequently, the consumer will attempt to purchase batteries that perform well in a variety of devices that may impose low drain, or high drain or high tech discharge conditions. If a consumer believes that a particular brand of battery provides optimum service when used in all devices, then the consumer will be motivated to buy that brand of batteries rather than a different brand of batteries. Consequently, many battery manufacturers strive to develop and market batteries that are perceived by the consumer as "all purpose" batteries because the batteries power a wide range of devices for acceptable periods of time.

In addition to improving the length of time that their products will power a variety of devices, battery manufacturers constantly strive to reduce the cost of the battery. One way to reduce the cost is to decrease the quantity of electrochemically active material in one or both of the battery's electrodes. For example, the quantity of zinc in the anode and/or the quantity of manganese dioxide in the cathode could be reduced. However, this option is not acceptable to the manufacturer because any reduction in the quantity of electrochemically active material usually decreases the battery's "run time" which is the length of time the battery will run a device.

Previous attempts to address the problem of how to improve a battery's performance in a particular device, such as a camera, have usually involved changes to the cell's internal construction. In one example, the cell construction was modified by increasing the quantity of zinc in the anode. However, this change resulted in unacceptable leakage of electrolyte after the cell had been deeply discharged. In another example, instead of using a cell design in which one electrode is inserted into a centrally aligned cavity defined by the other electrode, some manufacturers have used a "jellyroll" construction in which two strip shaped electrodes and one separator are aligned with one another and then rolled to form a coil. Batteries with jellyroll constructions typically perform well in high drain devices. Unfortunately, the same cells provide substantially reduced service in low drain devices because a substantial portion of the electrochemically active material must be replaced with chemically inert separator due to the jellyroll's large anode-to-cathode surface area. Consequently, batteries made with a jellyroll construction are not well suited for use in devices where the cell's total electrochemical capacity is more important than the ability to discharge at a rapid rate.

Therefore, there is a need for an inexpensive alkaline electrochemical cell that has the ability to provide adequate run times in devices that require the battery to discharge at a high tech drain rate as well as provide adequate run times in devices that require the battery to discharge at a low drain rate.

BRIEF SUMMARY OF THE INVENTION

The present invention provides an electrochemical cell capable of discharging in an efficient manner under a variety of discharge conditions. In one embodiment, the electrochemical cell of this invention includes at least the following components. A container housing a first electrode, a second electrode, an alkaline electrolyte and a separator. The first electrode, which defines a cavity therein, includes manganese dioxide as an electrochemically active material. The first electrode's electrochemical capacity is determined by multiplying the grams of manganese dioxide by 285 mAhr/g. The second electrode, which is disposed within the cavity, includes zinc as an electrochemically active material. The second electrode's electrochemical capacity is determined by multiplying the grams of zinc by 821 mAhr/g. The separator is disposed at the interface of the first and second electrodes. The area of the interface is between 12.6 cm$^2$ and 13.2 cm$^2$. The ratio of the second electrode's electrochemical capacity to the first electrode's electrochemical capacity is between 1.33:1 and 1.40:1.

In another embodiment the electrochemical cell of the present invention is an LR6 battery that includes at least the following components and performance characteristics. A cylindrical container housing a first electrode defining a cavity therein. A second electrode comprising less than 50 ppm of mercury and disposed within the cavity defined by the first electrode. A separator located between the electrodes. An alkaline electrolyte contacting the separator and both electrodes. The first electrode includes manganese dioxide as an electrochemically active material which has an electrochemical capacity determined by multiplying the grams of manganese dioxide by 285 mAhr/g. The second electrode includes zinc as an electrochemically active material. The second electrode's electrochemical capacity is determined by multiplying the grams of zinc by 821 mAhr/g. The ratio of the second electrode's electrochemical capacity to the first electrode's electrochemical capacity is between 1.33:1 and 1.40:1. The cell, if discharged at 250 milliamps constant current for one hour per day until the cell's closed circuit voltage falls below 0.90 volt, would have a minimum discharge efficiency of at least 81.0 % based on the first electrode's electrochemical capacity. Alternatively, the cell, if discharged across a 3.3 ohm resistor for four minutes per hour, eight hours per day, until the cell's voltage falls below 0.90 volt, would have a minimum discharge efficiency of at least 78.0% based on the first electrode's electrochemical capacity. Alternatively, the cell, if discharged at a rate of 100 milliamps for one hour per day until said cell's closed circuit voltage falls below 0.90 volt, would have a minimum discharge efficiency of at least 93.0% based on the first electrode's electrochemical capacity.

In yet another embodiment, the present invention is an electrochemical cell that includes the following components. A container that houses a first electrode which defines a cavity therein. The cavity created by utilizing a cylindrical tool to impact mold the first electrode into a tubular configuration. The tool's circumference is at least 29.12 mm. The container has an outside diameter between 13.89 mm and 14.00 mm. A separator lining the cavity. A second electrode comprising zinc powder is disposed within the separator lined cavity. The zinc powder has a tap density greater than 2.80 g/cc and less than 3.65 g/cc, a BET specific surface area greater than 400 $cm^2/g$, a KOH absorption value of at least 14% and a $D_{50}$ less than 130 microns. An alkaline electrolyte, disposed within the container, contacts the electrodes and the separator.

DESCRIPTION OF THE DRAWINGS

FIG. 2 is a chart showing the discharge efficiencies of cells of the present invention and commercially available cells;

DESCRIPTION

Figure 1:
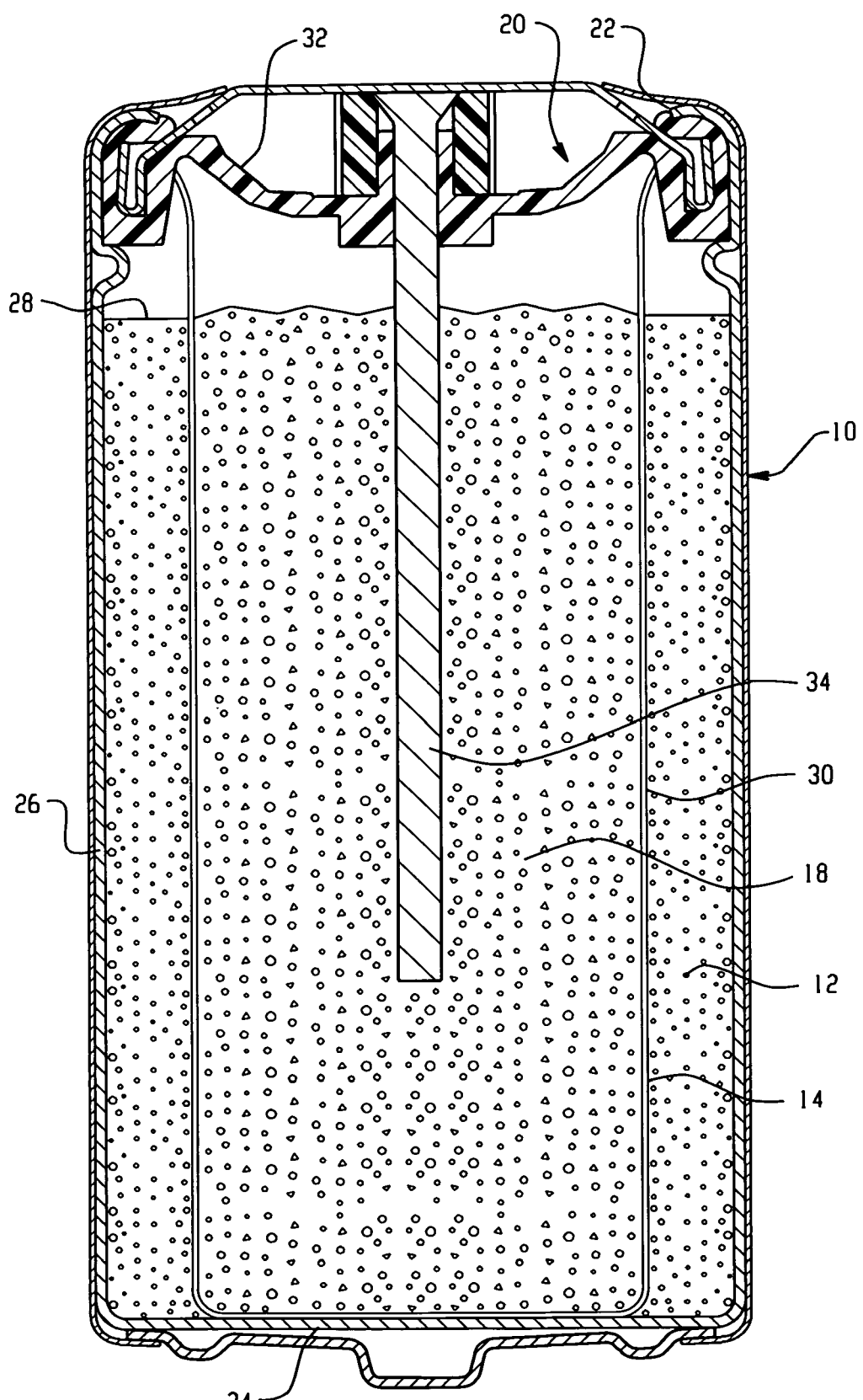
FIG. 1 is a cross-sectional view of an alkaline electrochemical cell of the present invention.

Referring now to the drawings and more particularly to FIG. 1, there is shown a cross-sectional view of an assembled electrochemical cell of this invention. Beginning with the exterior of the cell, the cell components are the container 10, first electrode 12 positioned adjacent the interior surface of container 10, separator 14 contacting the interior surface 16 of first electrode 12, second electrode 18 disposed within the cavity defined by separator 14 and closure assembly 20 secured to container 10. Container 10 has an open end 22, a closed end 24 and a sidewall 26 therebetween. The closed end 24, sidewall 26 and closure assembly 20 define a sealed volume in which the cell's electrodes are housed.

First electrode 12, also referred to herein as the cathode, includes manganese dioxide as the electrochemically active material. The electrode is formed by disposing a quantity of the mixture into the open ended container and then using a ram to mold the mixture into a solid tubular configuration that defines a cavity which is concentric with the sidewall of the container. First electrode 12 has a ledge 28 and an interior surface 30. Alternatively, the cathode may be formed by preforming a plurality of rings from the mixture comprising manganese dioxide and then inserting the rings into the container to form the tubularly shaped first electrode. The cell shown in FIG. 1 would typically include three or four rings.

Second electrode 18, also referred to herein as the anode, is a homogenous mixture of an aqueous alkaline electrolyte, zinc powder, and a gelling agent such as crosslinked polyacrylic acid. The zinc powder is the second electrode's electrochemically active material. The aqueous alkaline electrolyte comprises an alkaline metal hydroxide such as potassium hydroxide, sodium hydroxide, or mixtures thereof. Potassium hydroxide is preferred. A gelling agent suitable for use in a cell of this invention is a crosslinked polyacrylic acid, such as Carbopol 940®, which is available from Noveon, Inc., Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy. Optional components such as gassing inhibitors, organic or inorganic anticorrosive agents, binders or surfactants may be added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like. The second electrode may be manufactured by combining the ingredients described above into a ribbon blender or drum mixer and then working the mixture into a wet slurry.

In addition to the aqueous alkaline electrolyte absorbed by the gelling agent during the anode manufacturing process, an additional quantity of an aqueous solution of potassium hydroxide, also referred to herein as "free electrolyte", may also be added to the cell during the manufacturing process. The free electrolyte may be incorporated into the cell by disposing it into the cavity defined by the first electrode. The method used to incorporate free electrolyte into the cell is not critical provided it is in contact with the first electrode 12, second electrode 18 and separator 14. A free electrolyte that may be used in the cell shown in FIG. I is an aqueous solution containing 37.0% by weight KOH.

In the bobbin-type zinc/manganese dioxide alkaline cell shown in FIG. 1, the separator 14 is commonly provided as a layered ion permeable, non-woven fibrous fabric which separates the cathode (first electrode) from the anode (second electrode). A suitable separator is described in WO 03/043103. The separator maintains a physical dielectric separation of the positive electrode's electrochemically active material (manganese dioxide) and the negative electrode's electrochemically active material (zinc) and allows for the transport of ions between the electrode materials. In addition, the separator acts as a wicking medium for the electrolyte and as a collar that prevents fragmented portions of the anode from contacting the top of the cathode. A typical separator usually includes two or more layers of paper. Conventional separators are usually formed either by preforming the separator material into a cup-shaped basket that is subsequently inserted into the cavity defined by the first electrode or forming a basket during cell assembly by inserting into the cavity two rectangular sheets of separator material angularly rotated ninety degrees relative to each other. The conventional preformed separators are typically made up of a sheet of non-woven fabric rolled into a cylindrical shape that conforms to the inside walls of the first electrode and has a closed bottom end.

Closure assembly 20 comprises closure member 32 and current collector 34. Closure member 32 is molded to contain a vent that will allow the closure member to rupture if the cell's internal pressure becomes excessive. Closure member 32 may be made from Nylon 6,6 or another material, such as a metal, provided the current collector 34 is electrically insulated from the container 10 which serves as the current collector for the first electrode. Current collector 34 is an elongated nail shaped component made of brass. Collector 34 is inserted through a centrally located hole in closure member 32.

The formula of a first electrode suitable for use in a cell of this invention is shown in Table 1. The quantities are expressed in weight percent.

TABLE 1

| Component | Weight Percent |
|---|---|
| Manganese Dioxide | 83.21 |
| Graphite | 6.41 |
| 37 wt % KOH | 9.18 |
| Barium Sulfate | 1.20 |

The manganese dioxide, graphite and barium sulfate are mixed together to form a homogenous mixture. During the mixing process, the 37% KOH solution is evenly dispersed into the mixture thereby insuring a uniform distribution of the solution throughout the cathode materials. Manganese dioxide ($MnO_2$) is commercially available as natural manganese dioxide (NMD), chemical manganese dioxide (CMD) or electrolytic manganese dioxide (EMD). The preferred manganese dioxide for use in a cell of this invention is EME. Suppliers of EMD for use in alkaline batteries include: Kerr-McGee Chemical Corporation of Oklahoma City, Oklahoma; Tosoh Corporation of Tokyo, Japan; and Erachem Comilog, Inc. of Baltimore, Md. Graphite is mixed with the manganese dioxide to provide an electrically conductive matrix throughout the cathode. The graphite may be mined from the ground (natural) or manufactured (synthetic). Furthermore, the graphite may be expanded or non-expanded. Suppliers of graphite for use in alkaline batteries include: Timcal America of Westlake, Ohio; Superior Graphite Company of Chicago, Ill.; and Lonza, Ltd of Basel, Switzerland. The barium sulfate can be purchased from Bario E Derivati S.p.A. of Massa, Italy.

A formula for a second electrode suitable for use in a cell of this invention is shown in Table 2. The composition of the gelled electrolyte is shown in Table 3. The quantities are expressed in weight percent.

TABLE 2

| Component | Weight Percent |
|---|---|
| Zinc powder | 68.30 |
| Gelled Electrolyte | 30.33 |
| Surfactant Solution | 0.14 |
| 0.1 N KOH solution | 1.23 |

TABLE 3

| Component | Weight Percent |
|---|---|
| 45% KOH | 65.80 |
| Deionized water | 32.90 |
| Zinc oxide | 1.00 |
| Sodium Silicate | 0.30 |

The process for preparing the anode includes the following steps. The components shown in Table 3 were mixed to form a solution with the zinc oxide and sodium silicate dissolved therein. This solution was then mixed with a gelling agent to form a gelled electrolyte. The composition of the gelled electrolyte is shown in Table 4.

TABLE 4

| Component | Weight Percent |
|---|---|
| 45% KOH solution | 98.60 |
| Gelling Agent | 1.40 |

TABLE 5

| Component | Weight Percent |
|---|---|
| Disperbyk 190 | 2.43 |
| Gelling Agent | 97.57 |

The surfactant solution was prepared by mixing Disperbyk 190, available from BYK Chemie which is located in Germany, with deionized water in the proportions shown in Table 5. The gelled electrolyte was then mixed with the zinc powder, surfactant solution and 0.1 N KOH solution according to the proportions shown in Table 2 thereby forming a second electrode suitable for use in a cell of this invention.

Anodes that are suitable for use in a primary (nonrechargeable) battery having an alkaline electrolyte are typically manufactured by combining particulate zinc with a gelling agent, an aqueous alkaline solution and optional additives as described above. The ratio of any one ingredient to one or more of the other ingredients can be adjusted, within certain limitations, to comply with various limitations that are imposed by: the processing equipment; cell design criteria such as the need to maintain particle-to-particle contact; and cost constraints. With regard to maintaining particle-to-particle contact in mercury free batteries, which are defined herein as containing less than 50 ppm of mercury in the anode, many cell designers of commercially available cylindrical alkaline batteries have specified using at least 28 volume percent zinc powder in order to maintain particle-to-particle contact between the zinc particles. In a preferred embodiment of a cell of this invention, the quantity of zinc in the anode is reduced to less than 28.0 volume percent. Anodes made with 27.0 volume percent zinc, 26.0 volume percent zinc or 24.0 volume percent zinc are feasible. The volume percent zinc is determined by dividing the volume of zinc by the volume of the anode just prior to dispensing the anode into the separator lined cavity as will be explained below. The volume percent zinc must be determined before dispensing the anode into the separator basket because a portion of the electrolyte incorporated into the anode migrates into the separator and cathode as soon as the anode is inserted into the cavity defined by the separator. The volume percent zinc is determined using the following procedure. Calculate the volume of zinc in a cell by dividing the weight of zinc in the cell by the density of zinc (7.13 g/cc). Calculate the volume of the anode mix by dividing the weight of the anode mix just prior to disposing the anode mix in the cell by the measured density of the anode mix. Then divide the volume of zinc by the volume of the anode mix to obtain the volume percent zinc. The apparent density of the anode mix is determined using the following procedure. Weigh an empty container having a known volume, such as 35 cc. Dispose a quantity of anode into the container such that the anode completely fills the container. Calculate the weight of the anode by weighing the filled container and then subtracting the weight of the empty container. Divide the anode's weight by the volume of the container to get the anode's apparent density.

Reducing the quantity of zinc to less than 28 volume percent is significant because a gelled anode containing less than 50 ppm of mercury must have a minimum volume of particulate zinc in order to establish and maintain particle-to-particle contact between the zinc particles that are uniformly distributed throughout the height and width of the anode. The particle-to-particle contact must be maintained during the entire useful life of the battery. If the volume of zinc in the anode is too low, the cell's voltage may suddenly drop to an unacceptably low value when the cell is powering a device. The voltage drop is believed to be caused by a loss of continuity between some of the anode's zinc particles thereby electrically isolating a portion of the anode so that it cannot participate in the cell's discharge. If the voltage remains low, the cell must be replaced by the consumer. If the voltage quickly recovers to an acceptable value, the device may resume working in a normal manner. However, the consumer could incorrectly perceive the temporary interruption in the device's performance as a sign that the battery is about to expire and may be motivated to replace the cell prematurely. Consequently, cell manufacturers have conventionally used more than the minimum volume of particulate zinc in a mercury free gelled anode in order to insure reliable service throughout the complete life of the battery.

Zinc useful in a preferred embodiment of this invention may be purchased from N.V. UMICORE, S.A., in Brussels, Belgium under the designation BIA 115. The zinc is manufactured in a centrifugal atomization process as generally described in international publication number WO 00/48260 which published on Aug. 17, 2000. This publication discloses the composition of the zinc alloy and the manufacturing process used to produce the zinc powder. However, many physical characteristics of the zinc particles are not disclosed. In a preferred embodiment, the zinc powder has many of the following physical and chemical characteristics. First, the zinc powder's particle size is characterized as having a $D_{50}$ median value less than 130 microns, more preferably between 100 and 130 microns, and most preferably between 110 and 120 microns. The $D_{50}$ median value is determined by using the sieve analysis procedure described in the American Society for Testing and Materials (ASTM) standard B214-92, entitled Standard Test Method for Sieve Analysis of Granular Metal Powders, and the reporting procedure described in ASTM D1366-86 (Reapproved 1991), entitled Standard Practice for Reporting Particle Size Characteristics of Pigments. ASTM standards B214-92 and D1366-86 (Reapproved 1991) are herein incorporated by reference. As used in this document, the zinc powder's $D_{50}$ median value is determined by plotting the cumulative weight percentages versus the upper class size limits data, as shown in ASTM D-1366-86, and then finding the diameter (i.e. $D_{50}$) that corresponds to the fifty percent cumulative weight value. Second, the zinc powder's BET specific surface area is at least 400 $cm^2/g$. More preferably, the surface area is at least 450 $cm^2/g$. The BET specific surface area is measured on Micromeritics' model TriStar 3000 BET specific surface area analyzer with multi point calibration after the zinc sample has been degassed for one hour at 150° C. Third, the zinc powder's tap density is greater than 2.80 g/cc and less than 3.65 g/cc. More preferably, the tap density is greater than 2.90 g/cc but less than 3.55 g/cc. Most preferably, the zinc powder's tap density is greater than 3.00 g/cc and less than 3.45 g/cc. The tap density is measured using the following procedure. Dispense fifty grams of the zinc powder into a 50 cc graduated cylinder. Secure the graduated cylinder containing the zinc powder onto a tap density analyzer such as a model AT-2 "Auto Tap" tap density analyzer made by Quanta Chrome Corp. of Boynton Beach, Fla., U.S.A. Set the tap density analyzer to tap five hundred and twenty times. Allow the tap density analyzer to run thereby tapping the graduated cylinder by rapidly displacing the graduated cylinder in the vertical direction five hundred and twenty times. Read the final volume of zinc powder in the graduated cylinder. Determine the tap density of the zinc powder by dividing the weight of the zinc powder by the volume occupied by the zinc powder after tapping. Fourth, the zinc powder has a KOH absorption value of at least 14%. More preferably, the KOH absorption value is 15% or higher. The process used to determine the KOH adsorption value is described below in the portion of the specification pertaining to FIG. 3.

In addition to the physical characteristics described above, the preferred zinc is an alloy with bismuth and/or indium and/or aluminum incorporated therein. The preferred quantity of bismuth is between 75 and 125 ppm. The preferred quantity of indium is between 175 and 225 ppm. The preferred quantity of aluminum is between 75 and 125 ppm.

One of the parameters used by battery designers to characterize a cell design is the ratio of one electrode's electrochemical capacity to the opposing electrode's electrochemical capacity. For example, if the theoretical electrochemical capacity of the zinc containing second electrode, which is referred to herein as the anode and abbreviated as A, is 3528 mAhr and the theoretical capacity of the manganese dioxide containing first electrode, which is referred to herein as the cathode and abbreviated as C, is 2667 mAhr, then the A:C ratio is 1.32:1. For commercially available LR6 alkaline primary cells that employ zinc in the anode and manganese dioxide in the cathode, the A:C ratio has been less than 1.32:1. However, in one embodiment of this invention, the A:C ratio in cells of this invention was increased to 1.38:1. Cell constructions having an A:C ratio greater than 1.32:1, such as 1.34:1, 1.36:1, or 1.40:1, are feasible.

Figure 4:
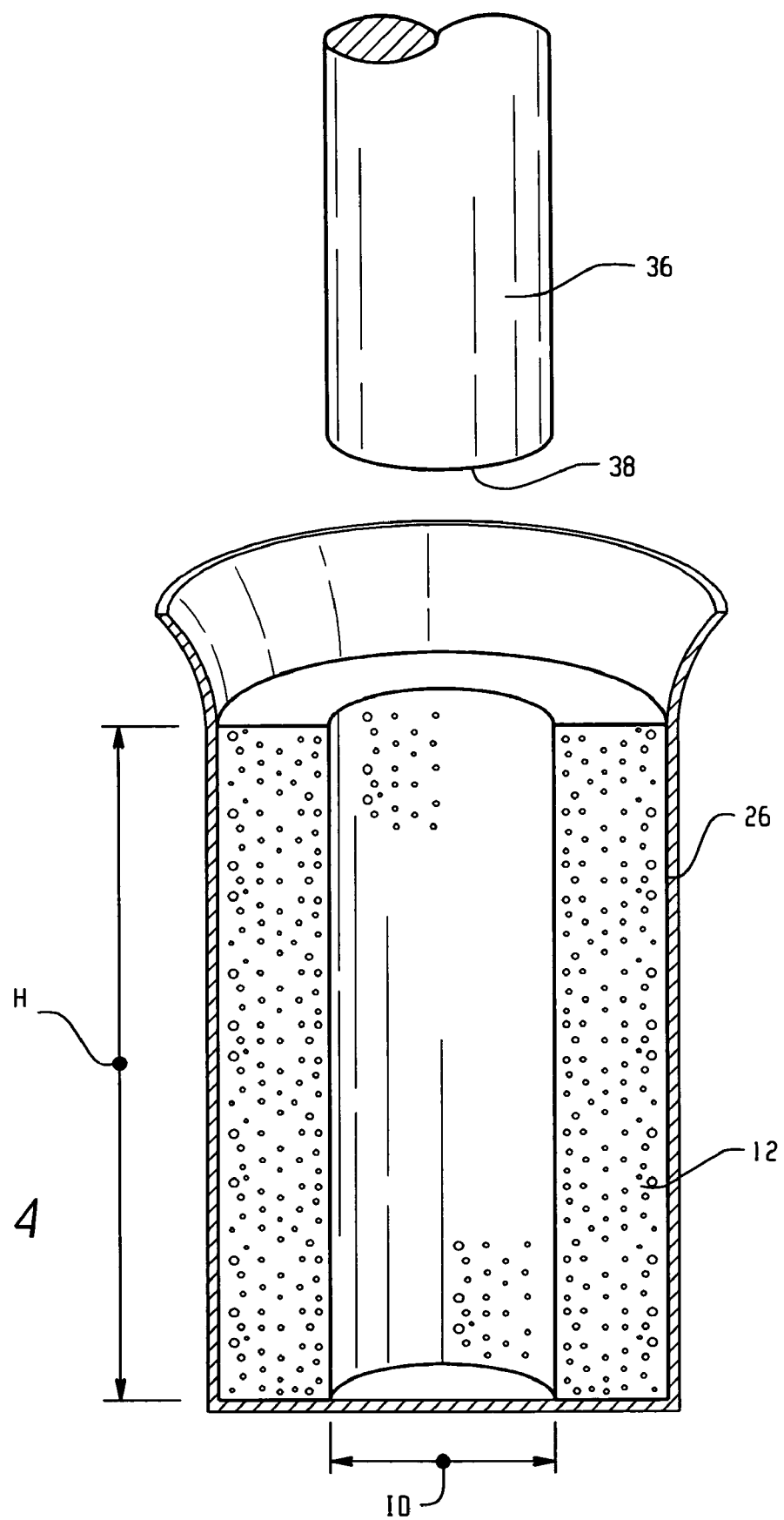
FIG. 4 is a cross section of a container housing an impact molded cathode.

Another parameter used by battery designers to characterize a cell construction is the area of the interface between the anode and the cathode. The area of the interface is defined as the area of the first electrode's tubularly shaped interior surface which is calculated by multiplying the circumference of the molding ram used to impact mold the cathode materials into a tubularly shaped configuration by the height of the first electrode that is opposed by the second electrode. Preferably, in an LR6 size battery, the area of the interface should be between 12.6 $cm^2$ and 13.2 $cm^2$. More preferably, the area of the interface should be between 12.75 $cm^2$ and 13.10 $cm^2$. Even more preferably, the area of the interface should be between 12.90 $cm^2$ and 13.05 $cm^2$. Referring to FIG. 4, the height (H) of first electrode 12 is multiplied by the circumference of molding ram 36. To achieve the full benefit of this invention, the circumference of the molding ram should be at least 29.12 mm. More preferably, the circumference of the molding ram should be at least 29.53 mm. Even more preferably, the circumference of the molding ram should be at least 29.92 mm. In a preferred embodiment of this invention, the first electrode defines a single, tubularly shaped cavity. Furthermore, the cavity is concentrically aligned with the opening in the container. Impact molding the first electrode against the interior surface of the container's sidewall is the preferred process for forming the first electrode into the container.

Within the battery industry, one widely accepted protocol used to evaluate and characterize batteries involves discharging individual cells on predefined electrical test circuits and then recording the length of time the battery's closed circuit voltage remains above a minimum value. These "discharge tests" are used by battery manufacturers to evaluate the run time of different cell constructions. In order to standardize the evaluation of a battery's performance on discharge tests, many cell sizes and test regimes have been defined and approved by organizations such as the American National Standards Institute (ANSI) and the International Electrotechnical Commission (IEC). Battery sizes, such as LR6 size batteries, are defined by the IEC's *International Standard 60086-2*, edition 10.1, as having a maximum height of 50.5 mm and a maximum diameter of 14.5 mm. The steel container typically used in an LR6 battery usually has an outside diameter between 13.89 mm and 14.00 mm. One publication that describes discharge tests for batteries, such as LR6 batteries, is entitled *ANSI C18.1M. Part 1-2001—American National Standard for Portable Primary Cells and Batteries with Aqueous Electrolyte—General Specifications* which was published in 2001 by the National Electrical Manufacturers Association. The discharge tests for the LR6 batteries described therein on page 19 are widely accepted within the battery industry as an acceptable way to evaluate a battery's electrochemical service performance. Some of the tests are commonly identified as "high rate" tests while others are identified as "high tech" tests and yet other tests are known as "low rate" tests.

In one experiment, several LR6 batteries of the present invention were constructed. The physical arrangement of the cell's electrodes, separator, closure assembly and container is disclosed in FIG. 1. The formula used to make the first electrode is disclosed in Table 1. The EMD was purchased from Kerr-McGee. The graphite was supplied by Timcal. The barium sulfate was purchased from Bario E Derivati S. p. A. The formulas used to make the second electrode are disclosed in tables 2, 3, 4 and 5. The experimental cells were manufactured as follows. The cathode materials were mixed together to form a flowable powder that was disposed into the container. Referring to FIG. 4, a solid rod shaped tool 36 having a circular cross-section, a 9.52 mm (0.375") outside diameter (OD), which corresponds to a 29.92 mm circumference, and a blunt leading end 38 was concentrically aligned with the opening in the container and then rapidly and forcefully inserted into the cathode material thereby impact molding the powder into a solid tubularly shaped component having a height of 4.338 cm and referred to herein as a cathode. The total weight of the cathode was 11.18 g. Based on the percentage of EMD shown in Table 1, the quantity of manganese dioxide in each cell was 9.30 g. However, because the EMD contained 2 weight percent water, the grams of EMD available to participate in the electrochemical reaction within the cell was 9.11 g which was obtained by multiplying 9.30 g by 0.98. The cavity defined by the cathode has an initial inside diameter that is equal to the outside diameter of the tool which may be referred to as a ram. However, due to the physical characteristics of the cathode materials, the inside diameter of the cavity decreases slightly soon after the withdrawal of the molding ram. The inner surface of the cathode defines a circular, centrally located cavity. Next, a first rectangularly shaped strip of separator paper was positioned above the cavity defined by the first electrode and then inserted into the cavity thereby lining the bottom and sidewall of the cavity. A second rectangularly shaped strip of separator paper was positioned above the separator lined cavity. The second strip was oriented perpendicularly to the first strip. The center of the second strip was then inserted into the cavity thereby forming a second layer of separator inside the first layer of separator. The surface area of the interface between the anode and cathode is 12.98 $cm^2$ which is obtained by multiplying 29.92 mm, the circumference of the rain by 4.338 cm which is the height of the cathode. A 6.38 gram quantity of the second electrode, having an apparent density of 2.87 g/cc, was then disposed into the separator lined cavity. The anode's volume, 2.22 cc, is determined by dividing 6.38 g by 2.87 g/cc. The quantity of zinc in each cell was 4.36 g. The zinc's volume, 0.61 cc, was determined by dividing 4.36 g by 7.13 g/cc. The volume percent zinc, 27.48%, was determined by dividing 0.61 cc by 2.22 cc. In addition to the electrolyte contained in the second electrode, another 0.95 cc of 37.0% by weight KOH solution was disposed into the separator lined cavity. A first portion of the 0.95 cc was injected into the separator lined cavity before the second electrode was inserted. The remaining portion of 37.0% by weight KOH solution was injected into the separator lined cavity after the second electrode had been inserted. A closure assembly was then secured to the open end of the container. A terminal cover and label were secured to the outer surface of the container.

The cells of this invention had a A:C ratio of 1.38 which was determined by dividing the amperehour capacity of the zinc containing electrode, which is calculated by multiplying 4.36 g×821 mAhr/g to obtain 3580 mAhr, by the amperehour capacity of the manganese dioxide containing electrode, which is calculated by multiplying 9.11 g×285 mAhr/g to obtain 2596 mAhr.

Cells constructed according to the present invention were then discharged on three separate service tests as will be described below. As part of the same experiment, commercially available LR6 batteries from different manufacturers were also evaluated. Shown in FIG. 2 is a chart of various cell constructions, including cells of this construction and commercially available LR6 cells, showing the discharge efficiencies of the cathode on three different discharge tests. As used herein, the discharge efficiency of the cathode is determined by dividing the cell's ampere hour output by the manganese dioxide's theoretical ampere hour input. The manganese dioxide's input is calculated by multiplying the number of grams of manganese dioxide by 285 mAhr/g. For example, a cell containing 9.36g of manganese dioxide would be considered to have an input of 2.667 Ahr. If the same cell provided 2.000 Ahr of output on a discharge test, then the discharge efficiency of the manganese dioxide would be 75%.

One of the low rate tests for LR6 size batteries specifies that a battery be discharged at 100 milliamps constant current for one hour and then allowed to rest for twenty-three hours. The test is continued each day until the battery's closed circuit voltage drops below 0.9 volt which is considered to be the functional end point at which many devices, such as a tape player, stop working. As shown in FIG. 2, when cells of the present invention were discharged on the 100 milliamps test for one hour per day as described above, the discharge efficiencies, based on the manganese dioxide's amperehour input, ranged from 94.4% to 95.7%. In contrast, the best individual discharge efficiency from any of the commercially available cells was 92.7%.

A high tech test for LR6 size batteries specifies that the battery be discharged at 250 milliamps constant current for one hour per day and then allowed to rest for twenty-three hours. The test is continued each day until the battery's closed circuit voltage falls below 0.9 volt. As shown in FIG. 2, when cells of the present invention were discharged on the 250 milliamp constant current test for one hour per day as described above, the discharge efficiencies, based on the manganese dioxide's amperehour input, ranged from 78.5% to 84.30%. Four of the five cells tested were greater than 81% efficient. Individual cell efficiencies of 81.0%, 82.0% and 83.0% are feasible. Data in FIG. 2 also shows that the best discharge efficiency of the commercially available cells was 80.3%.

A low to moderate rate discharge test for LR6 batteries involves discharging a battery across a 3.3 ohm resistor for four minutes per hour, eight hours per day, and then allowing the cell to rest for sixteen hours. The test is continued for consecutive days until the cell's voltage falls below 0.9 volt. As shown in FIG. 2, when cells of the present invention were discharged on the 3.3 ohm test, the discharge efficiencies, based on the manganese dioxide's amperehour input ranged from 83.3% to 84.6%. In contrast, the best single cell discharge efficiency from any of the four competitors was 77.3%. If desired, cells of this invention could be made with 78.0%, 80.0% or 82.0% discharge efficiency.

The battery tests described above were conducted in an environment in which the ambient temperature was approximately 21° C. Maintaining an ambient temperature between 19° C. and 23° C. is important because a battery's run time on a discharge test may increase as the ambient temperature increases and may decrease as the ambient temperature decreases. The extent of the impact of the change in ambient temperature on the run time varies by test. As is well known in the battery manufacturing industry, when batteries are discharged, the exothermal chemical reactions taking place within the battery cause the battery's temperature to increase. On high drain tests, the temperature on the surface of the cell may exceed 40° C. Consequently, the cell's temperature and the ambient temperature may differ substantially and are considered to be two different characteristics.

Figure 3:
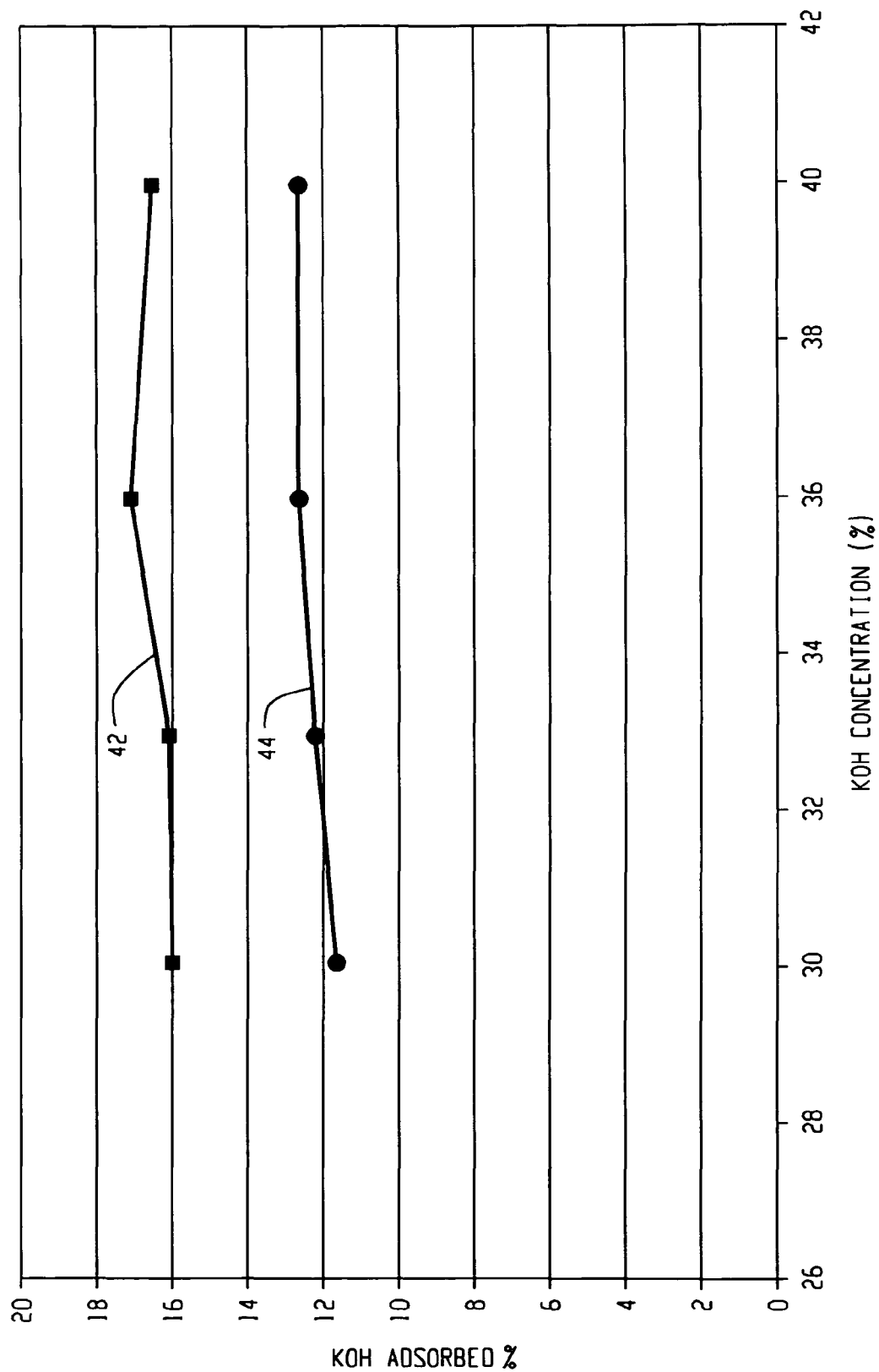
FIG. 3 is a graph that shows KOH absorption values for two zinc powders.

FIG. 3 shows the KOH absorption values for zinc powers using different weight percentages of KOH. The following process was used to determine the zinc's KOH absorption value. First, provide a 5cc syringe and a piece of separator that has been soaked in 32 wt % KOH and is appropriately sized to facilitate insertion of the separator into the large open end of the syringe and can be pushed through the syringe thereby blocking the smaller opening in the opposite end of the syringe. Second, weigh the syringe and separator containing absorbed electrolyte. Third, dispose two milliliters of a 32% by weight aqueous KOH solution into the large open end of the syringe while blocking the flow of the electrolyte through the smaller opening in the opposite end of the syringe. Fourth, a known quantity of particulate zinc, such as five grams, is carefully weighed and disposed into the open end of the syringe. The shape of the container, the volume of the solution and the volume of the zinc must be coordinated to insure that all of the zinc particles are fully submerged beneath the surface of the aqueous KOH solution. Fifth, an additional 1.5 cc of 32% by weight KOH solution is introduced into the container to insure that the zinc is fully covered with the solution. Sixth, the KOH solution is allowed to drain through the small opening at one end of the syringe for 120 minutes by orienting the syringe in a vertical position and removing the object that blocks the small opening. To insure that there are no droplets of unabsorbed solution trapped between the particles of zinc, the container is lightly tapped several times onto a paper towel until no additional KOH solution is observed landing on the paper towel. Seventh, the combined weight of the zinc with the solution adsorbed thereon, the syringe and the separator is then determined. The quantity of electrolyte solution adsorbed onto the surface of the zinc is determined by subtracting the weight of the dry zinc particles, wet separator and syringe from the combined weight of the syringe containing zinc with adsorbed electrolyte thereon and the wet separator. The KOH absorption value is determined by dividing the weight of the KOH adsorbed onto the zinc by the weight of the zinc particles prior to disposing them into the solution.

In FIG. 3, curve 42 represents the KOH adsorption values for zinc useful in a preferred embodiment of this invention. Curve 44 represents the KOH adsorption values for commercially available zinc. Although the weight percent KOH in the adsorbed solution was varied from 30% to 40%, the quantity of solution adsorbed by the zinc useful in a preferred embodiment of this invention was at least 14%. Furthermore, the KOH adsorption for the same samples exceeded at least 15%. In contrast, the KOH adsorption for the commercially available zinc did not exceed 13%. The KOH adsorption value of a particular zinc powder is believed to be one of several measurable characteristics that are useful in identifying zinc that would be useful in a preferred embodiment of this invention.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

I claim:

1. An electrochemical cell, comprising:
a cylindrical container housing a first electrode, a second electrode, an alkaline electrolyte, and a separator; said first electrode defines a tubular cavity therein and comprises manganese dioxide as an electrochemically active material, said first electrode's electrochemical capacity determined by multiplying the grams of manganese dioxide by 285 mAhr/g; said second electrode, disposed within said cavity, comprises zinc as an electrochemically active material, said second electrode's electrochemical capacity determined by multiplying the grams of zinc by 821 mAhr/g; said separator disposed at the interface between the first and second electrodes, wherein said cell is an LR6 size cell, the area of the interface is between 12.6 $cm^2$ and 13.2 $cm^2$ and the ratio of the second electrode's electrochemical capacity to the first electrode's electrochemical capacity is between 1.33:1 and 1.40:1, wherein said zinc consists of particulate zinc, and wherein said particulate zinc has a BET specific surface area greater than 400 $cm^2/g$, a KOH absorption value of at least 14%, and a $D_{50}$ less than 130 microns.

2. The electrochemical cell of claim 1 wherein the ratio of the second electrode's electrochemical capacity to the first electrode's electrochemical capacity is at least 1.34:1.

3. The electrochemical cell of claim 1 wherein the ratio of the second electrode's electrochemical capacity to the first electrode's electrochemical capacity is at least 1.36:1.

4. The electrochemical cell of claim 1 wherein the ratio of the second electrode's electrochemical capacity to the first electrode's electrochemical capacity is at least 1.38:1.

5. The electrochemical cell of claim 1 wherein said cavity has an initial inside diameter of at least 9.52 mm and the outside diameter of said container is between 13.89 mm and 14.00 mm.

6. The electrochemical cell of claim 5 wherein said first electrode defines a single cavity.

7. The electrochemical cell of claim 1 wherein said first electrode is formed by impact molding.

8. The electrochemical cell of claim 1, wherein the area of the interface is between 12.75 $cm^2$ and 13.10 $cm^2$.

9. The electrochemical cell of claim 1, wherein the area of the interface is between 12.90 $cm^2$ and 13.05 $cm^2$.

10. The electrochemical cell of claim 1, wherein said cell is an LR6 size cell, said second electrode has less than 50 ppm of mercury, a quantity of said alkaline electrolyte is in contact with said electrodes and separator, and said cell, if discharged at 250 milliamps constant current for one hour per day until said cell's closed circuit voltage falls below 0.90 volt, would have a minimum discharge efficiency of at least 81.0% based on said first electrode's electrochemical capacity.

11. The electrochemical cell of claim 10, wherein said minimum discharge efficiency is at least 82.0%.

12. The electrochemical cell of claim 10, wherein said minimum discharge efficiency is at least 83.0%.

13. The electrochemical cell of claim 10, wherein said cell, if discharged across a 3.3 ohm resistor for four minutes per hour, eight hours per day, until said cell's closed circuit voltage falls below 0.9 volt, would have a minimum discharge efficiency of at least 78.0% based on said first electrode's electrochemical capacity.

14. The electrochemical cell of claim 13, wherein said minimum discharge efficiency on the 3.3 ohm test is at least 80.0%.

15. The electrochemical cell of claim 13, wherein said minimum discharge efficiency on the 3.3 ohm test is at least 82.0%.

16. The electrochemical cell of claim 10 comprising a single first electrode and a single second electrode.

17. The electrochemical cell of claim 1, wherein said cell is an LR6 size cell, said second electrode has less than 50 ppm of mercury, a quantity of said alkaline electrolyte is in contact with said electrodes and separator, and said cell, if continuously discharged at a rate of 100 milliamps for one hour per day until said cell's closed circuit voltage falls below 0.90 volt, would have a minimum discharge efficiency of at least 93.0% based on said first electrode's electrochemical capacity.

18. The electrochemical cells of claim 17, wherein said cell's discharge efficiency is at least 94.4%.

19. The electrochemical cells of claim 17, wherein said cell's discharge efficiency is at least 95.7%.

20. The electrochemical cells of claim 17, wherein said cell, if discharged at 250 milliamps constant current for one hour per day until said cell's closed circuit voltage falls below 0.90 volt, would have a minimum discharge efficiency of at least 81.0% based on said first electrode's electrochemical capacity.

21. The electrochemical cells of claim 20, wherein said cell's discharge efficiency is at least 82.0%.

22. The electrochemical cells of claim 20, wherein said cell's discharge efficiency is at least 83.0%.

23. The electrochemical cell of claim 17 comprising a single first electrode and a single second electrode.

24. The electrochemical cell of claim 1 comprising a single first electrode and a single second electrode.

25. An electrochemical cell, comprising:
a cylindrical container housing a first electrode, a second electrode, an alkaline electrolyte, and a separator; said first electrode defines a tubular cavity therein and comprises manganese dioxide as an electrochemically active material, said first electrode's electrochemical capacity determined by multiplying the grams of manganese dioxide by 285 mAhr/g; said second electrode, disposed within said cavity, comprises zinc as an electrochemically active material, said second electrode's electrochemical capacity determined by multiplying the grams of zinc by 821 mAhr/g; said separator disposed at the interface between the first and second electrodes, wherein said cell is an LR6 size cell, the area of the interface is between 12.6 cm² and 13.2 cm² and the ratio of the second electrode's electrochemical capacity to the first electrode's electrochemical capacity is between 1.33:1 and 1.40:1, wherein said zinc consists of particulate zinc, wherein said particulate zinc has a tap density greater than 2.80 g/cc and less than 3.65 g/cc, said second electrode has a known volume, and said particulate zinc occupies less than 28.0 volume percent of said second electrode's volume.

26. An electrochemical cell, comprising:
a container housing a first electrode, said electrode defining a cavity therein, said cavity created by utilizing a cylindrical tool to impact mold said first electrode comprising manganese dioxide into a tubular configuration, said tool having a circumference of at least 29.12 mm, said container having an outer diameter between 13.89 mm and 14.00 mm;
a separator lining said cavity and contacting said first electrode;
a second electrode comprising zinc powder and disposed within said separator lined cavity, said zinc powder having a tap density greater than 2.80 g/cc and less than 3.65 g/cc, a BET surface area greater than 400 cm²/g, a KOH absorption value of at least 14%, and a $D_{50}$ less than 130 microns; and
a quantity of alkaline electrolyte disposed within said container and in contact with said electrodes and said separator; wherein
said cell is an LR6 size cell, said first electrode's electrochemical capacity is determined by multiplying the grams of manganese dioxide by 285 mAhr/g, said second electrode's electrochemical capacity is determined by multiplying the grams of zinc by 821 mAhr/g, the ratio of the second electrode's electrochemical capacity to the first electrochemical capacity is between 1.33:1 and 1.40:1, and the area of interface between the first and second electrodes is between 12.6 cm² and 13.2 cm².

27. The electrochemical cell of claim 26 wherein said circumference is at least 29.53 mm.

28. The electrochemical cell of claim 26 wherein said circumference is at least 29.92 mm.

29. The electrochemical cell of claim 26 comprising a single first electrode and a single second electrode.

* * * * *